United States Patent [19]

Mizikovsky et al.

[11] Patent Number: 5,524,135

[45] Date of Patent: Jun. 4, 1996

[54] METHOD AND APPARATUS FOR SECURE DOWNLOADING OF OPERATIONAL INFORMATION INTO A WIRELESS COMMUNICATIONS DEVICE

[75] Inventors: Semyon Mizikovsky, Union, N.J.; Geoffrey Anderson, Cornwall, N.Y.; Gerard Wahl, Kendall Park, N.J.; Peter Douma, Wyckoff, N.J.; Masaaki Akahane, Mahwah, N.J.

[73] Assignee: Sony Corporation, Tokyo, Japan

[21] Appl. No.: 195,800

[22] Filed: Feb. 14, 1994

[51] Int. Cl.[6] .................................................. H04Q 7/20
[52] U.S. Cl. .............................. 379/58; 379/59; 379/63; 455/33.1
[58] Field of Search .................................. 379/58, 59, 61, 379/62, 63; 455/33.1, 54.1; 380/21, 23

[56] References Cited

U.S. PATENT DOCUMENTS

| | | | |
|---|---|---|---|
| 5,073,932 | 12/1991 | Yossifor et al. | 379/62 |
| 5,091,942 | 2/1992 | Dent | 379/59 |
| 5,239,294 | 8/1993 | Flanders et al. | 379/62 |
| 5,293,576 | 3/1994 | Mihm, Jr. et al. | 380/21 |
| 5,384,828 | 1/1995 | Brown et al. | 379/61 |
| 5,414,751 | 5/1995 | Yamada | 379/58 |

FOREIGN PATENT DOCUMENTS

WO92/02103  2/1992  WIPO .............................. H04Q 7/00

OTHER PUBLICATIONS

TIA/EIA Telecommunications Systems Bulletin—TSB50, Mar., 1993.
EIA/TIA Interim Standard—IS-54-B, Apr., 1992.

Primary Examiner—Curtis Kuntz
Assistant Examiner—William G. Trost
Attorney, Agent, or Firm—Lise A. Rode; Robert P. Biddle; Jerry A. Miller

[57] ABSTRACT

A method for secure and prompt distribution of critical operational information to a wireless cellular or PCS subscriber station via wireless interface which includes the steps of generating operational information, storing the operational information into a first memory of a wireless base station, and transmitting at least a portion of the operational information stored in the first memory to a wireless subscriber station via a wireless interface at random times during an active conversation state of the wireless subscriber station. The operational information stored in a second memory register in the subscriber station is updated with the operational information transmitted from the first memory. Where at least a portion of new operational information is received by the subscriber station, a first update counter is incremented to reflect the number of operational information updates received by the subscriber station. The value of the contents of the first update counter is then reported to the wireless base station via a wireless interface. Where the value of the contents of the first update counter is different from the value of the contents of a second update counter in the base station, the base station will synchronize the second counter to be the same as the first counter, and will retransmit a portion of the operational information.

6 Claims, 5 Drawing Sheets

METHOD AND APPARATUS FOR SECURE DOWNLOADING OF OPERATIONAL INFORMATION INTO A WIRELESS COMMUNICATIONS DEVICE

FIELD OF THE INVENTION

The present invention relates to a procedure for secure downloading of operational information into a wireless communications device, such as a cellular telephone, via a wireless interface in such a way that the probability of theft or pirating of the operational information is greatly decreased. More specifically, the present invention relates to a procedure for secure downloading of operational information into a cellular telephone wherein operational information is generated and stored in memory of a base station of the wireless service provider (home operator) and subsequently, at one or more random times thereafter, is transmitted, at least in part, to the wireless communications device via a wireless interface during an active conversation state, or telephone call, of the wireless communications device. This stored operational information is then used to update the current operational information stored in memory of the wireless communications device. This procedure is repeated until all stored operational information stored in memory of the base station has been transmitted to the cellular telephone and the current operational information has been updated and replaced with the stored operational information.

BACKGROUND

Personal subscriber stations such as cellular telephones or other Personal Communication System (PCS) equipment are commonly used to communicate with other parties via a wireless communications system, such as a cellular telephone network. The ability of a personal subscriber station to access and properly operate within a wireless communications system depends in large part upon certain unique, and often secret, operational information which is programmed into each subscriber station prior to activation of wireless service, or initial use of the equipment within the wireless system. Generally, this operational information is used for such things as "authentication" of the subscriber station. Authentication is a procedure whereby information is exchanged between a subscriber station and a base station for purposes of enabling the base station to confirm the identity, or validity, of the subscriber station. A standardized method for authenticating a cellular subscriber station has been established by the Telecommunications Industry Association (TIA). This procedure is described in EIA/TIA Interim Standard IS-54 (IS-54) and TIA/EIA Telecommunications Systems Bulletin TSB50 (TSB50), both of which are hereby incorporated herein by reference.

A successful outcome of the authentication process generally occurs only when it can be demonstrated that the subscriber station and the base station process identical sets of Shared Secret Data (SSD). This Shared Secret Data is generally a multi-bit pattern stored in semi-permanent memory of the subscriber station. It is, however, known to the Base Station and is calculated, or derived, based upon certain information which may include operational information unique to the subscriber station. One method of deriving SSD is more thoroughly disclosed in TIA IS-54.

Operational information may include such things as a Mobile Identification Number (MIN), or a Personal Identification Number (PIN), sometimes referred to as "A-Key".

A Mobile Identification Number generally refers to the directory telephone number assigned to the particular subscriber unit and is considered non-secret. The Personal Identification Number on the other hand is a secret number which is managed by the Home Service Operator for each subscriber station. The PIN is intended primarily for use in "authenticating" the subscriber station. Both the PIN and MIN identities are uniquely assigned to a particular subscriber station which is further distinguished by an Electronic Serial Number (ESN). The ESN may be, for example, a 32-bit binary number which uniquely identifies the subscriber station to any cellular system. It is generally factory-set and is not readily alterable since modification thereof generally requires a special facility not normally available to subscribers. Whereas the ESN and MIN are generally not regarded as secret information, the PIN, or A-Key, is usually considered confidential. This confidentiality, however, may be jeopardized under commonly accepted practices for authenticating a cellular telephone or the like.

Generally, confidential operational information such as A-Key information is generated for a subscriber station only when a new customer, or subscriber, contracts with a wireless communication system operator (Home Service Operator) for wireless service. However, A-Key information may also be generated in those situations when the validity of an active A-Key value is in question.

A procedure for loading confidential A-Key or Authentication information, or the like, into a subscriber station via a numeric keypad, is described in TIA IS-54 and TIA TSB50. Under this procedure, A-Key information or values are usually generated and issued to a new subscriber by a Home Service Operator. The A-Key value information is then delivered to the new subscriber, in printed form, either at the point of sale by an agent of the Home Service Operator or via the postal service. With reference to FIG. 2, once the "A-Key" value information is received by a subscriber, the information must be manually entered, or programmed, via a keypad (23) into the subscriber station (20) during a special programming mode of the subscriber station. This information is then stored in the A-Key register (21).

Under the procedure for loading authentication information into a subscriber station described in IS-54 And TSB50, the confidential authentication information is, at best, only minimally secure from the risk of theft or pirating. This is due, in part, to the fact that operational personnel involved in generating, issuing, printing and mailing authentication information to subscribers, have access to the authentication information and ample opportunity to pirate the information during the course carrying out their duties. Further, by mailing authentication information to a subscriber, there exists the additional risk that the authentication information can be intercepted, or retrieved from the mail, by an unauthorized party. The stolen authentication information could then be loaded into a "clone" or "pirate" subscriber station, while the printed material disclosing the authentication information is re-mailed or otherwise allowed to reach the legitimate subscriber who would have no immediate knowledge that this confidential operational information had been pirated.

Other disadvantages of this method of generating and entering authentication information include the fact that the manual entry of, for instance, a 26 digit authentication number into a subscriber station can be awkward or burdensome for a user. Further, if an error is made during the manual entry of the authentication number the entire authentication number must be re-entered, since it is not possible to correct only the erroneously entered digit or digits.

SUMMARY OF THE INVENTION

The present invention is directed to overcoming the above noted shortcomings by allowing for secure and prompt downloading of operational information, such as confidential or secret authentication information, into a wireless cellular telephone or the like. The proposed method will allow for secure distribution of critical authentication information by way of a wireless interface. It will permit a wireless communication service provider, or operator, to properly and securely authenticate new subscribers within a relatively short period of time after a new subscriber has signed up for service. Further, the proposed method will allow for the distribution of confidential authentication information without the involvement of personnel in issuing, mailing or installing the authentication information. The present invention applies to the initial downloading of authentication information upon activation of wireless service, as well as subsequent periodic updates thereof, without the involvement of a subscriber or other personnel. More particularly, the present invention relates to a method of downloading operational information by generating operational information, storing the operational information into a first memory of a wireless base station, transmitting at least a portion of the operational information stored in the first memory to a wireless subscriber station via a wireless interface at random times which occur during an active conversation state of the wireless subscriber station. This transmitted operational information is then used to update the operational information stored in a second memory register in the subscriber station. When at least a portion of new operational information is received by the subscriber station, a first update counter is incremented to reflect the number of operational information updates received by the subscriber station. The value in the first update counter is then reported to the wireless base station via a wireless interface. If the value of the contents of the first update counter which is reported by the subscriber station is different from the value of the contents of a second update counter in the base station which is used to keep track of the number of operational information updates transmitted to the subscriber station, the base station will then synchronize the contents of the second update counter to be the same as the reported contents of the first update counter. The base station will then begin the process of reporting the new operational information to the subscriber station all over, from the beginning. If there is no difference between the reported contents of the first update counter and the contents of the second update counter, the base station will continue the process of transmitting any remaining operational information which has not yet been transmitted to the subscriber station.

The apparatus of the present invention relates to a wireless subscriber station which includes a receiver for receiving operational information transmitted from a base station via a wireless interface, a storage register, or memory, for storing operational information received from the base station by the receiver, an update counter for counting the number of times operational information is received from the base station by the receiver, and a transmitter for transmitting the value of the contents of the update counter to the base station via a wireless interface. Another aspect of the present invention is directed to a wireless base station which includes a generating means for generating operational information for assignment to a wireless subscriber station, a storage register, or memory, for storing the generated operational information and, a transmitter for transmitting at least a portion of the operational information stored in the memory register to a subscriber station via a wireless interface.

DESCRIPTION OF THE INVENTION

Figure 1:
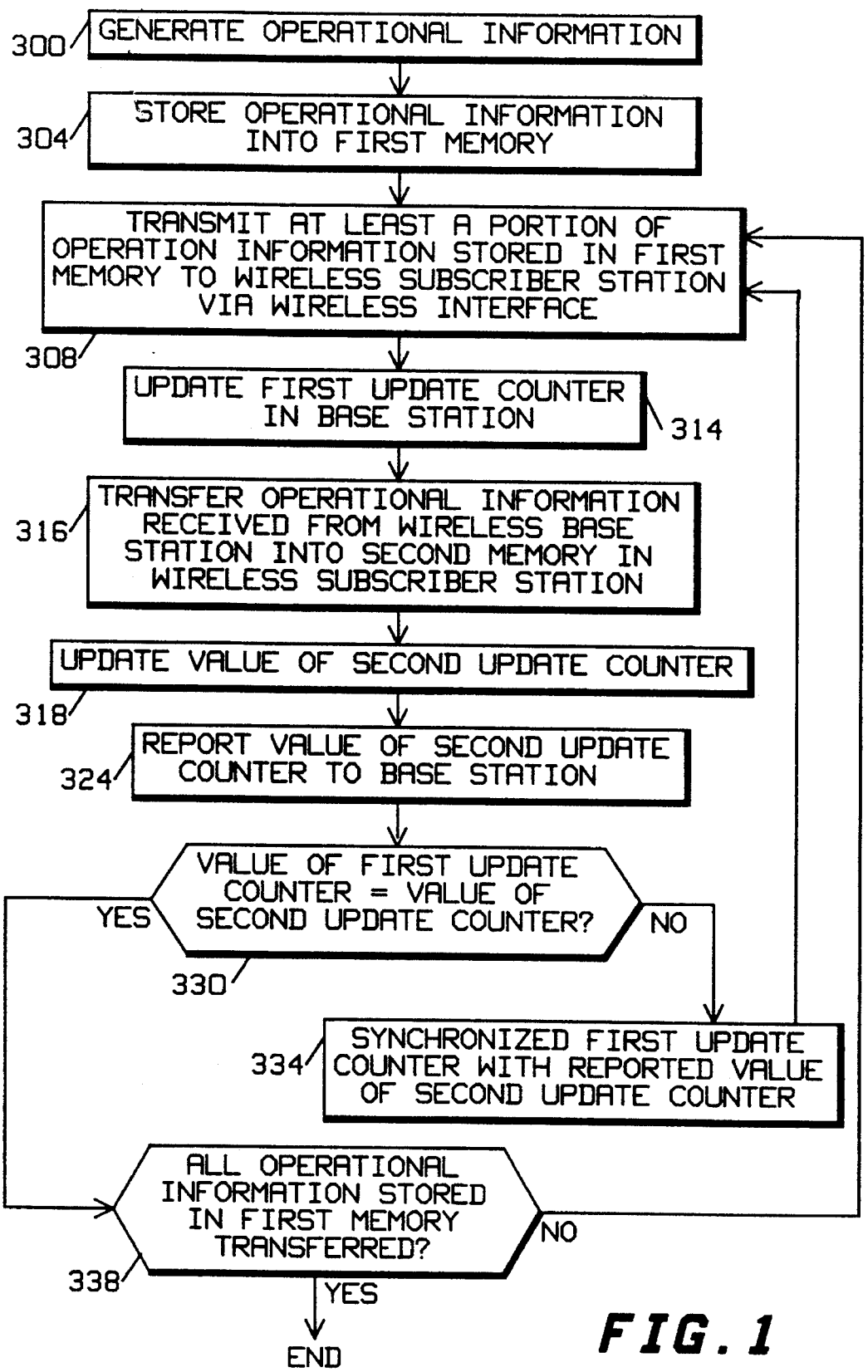
FIG. 1 is a Flow Chart Illustrating the Method of the present invention.
Figure 2:
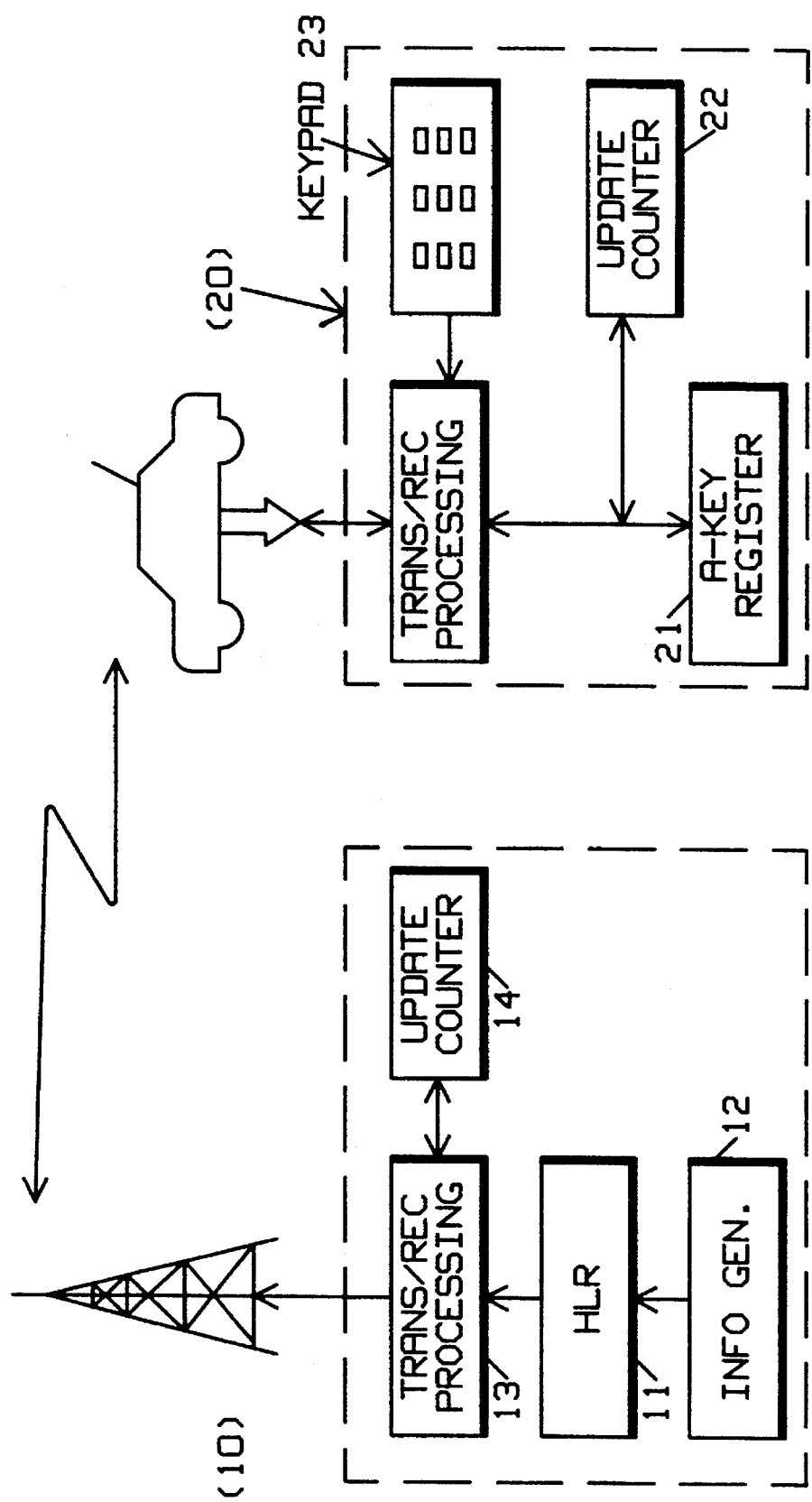
FIG. 2 is an illustration of one embodiment of the present invention

With reference to FIG. 1 and FIG. 2, in the present invention, a home service provider or the like generates a new Personal Identification Number (PIN) or A-Key value at step 300 for a new subscriber station at the time a new subscriber station is signed up for wireless service. This new A-Key value is then stored by the Home Service provider in a temporary memory register, or Home Location Register or HLR (11), of the Home Service Base Station (10) at step 304. The A-Key information is not directly issued to the subscriber or otherwise delivered in printed form.

Figure 3:
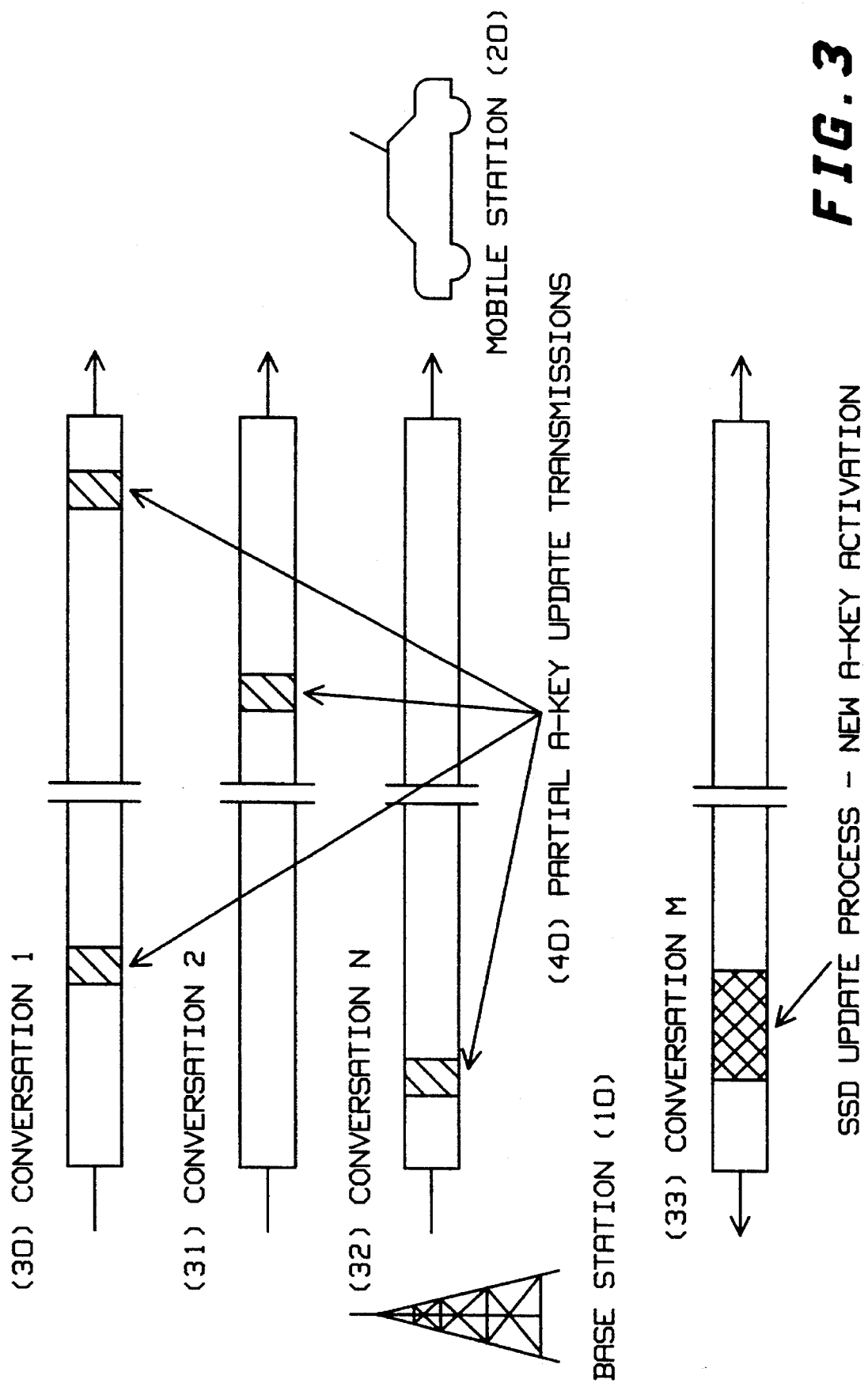
FIG. 3 is an illustration showing the process of transmitting at least a partial up-dated of an A-Key value to a subscriber station over the course of several telephone calls.

Subsequently, once an active conversation state is established, the home base station (20) will transmit at least a portion of the A-Key value information stored in the HLR to the new subscriber station (20) at step 308. This transmission of information will occur at random times during an active conversation state of the subscriber station. It is not necessary that all new A-Key value information be transmitted to the subscriber station during a single active conversation state or telephone call. Such random transmissions of information may take place over the course of several active conversation states or telephone calls. This process is referred to as an A-Key value update. FIG. 2 and FIG. 3 show the A-Key value update which takes place in several partial transmissions (40) which occur over the course of several telephone conversations (30–33).

Figure 4:
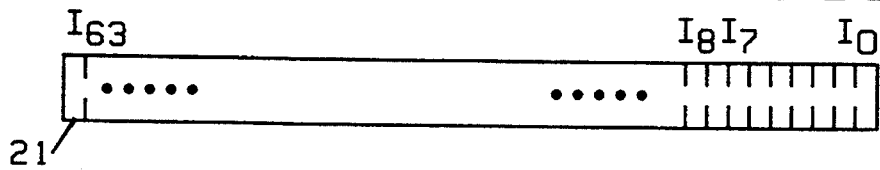
FIG. 4 is an illustration showing updated contents of an A-Key register of a wireless subscriber station over the course of several partial A-Key updates.
Figure 4:
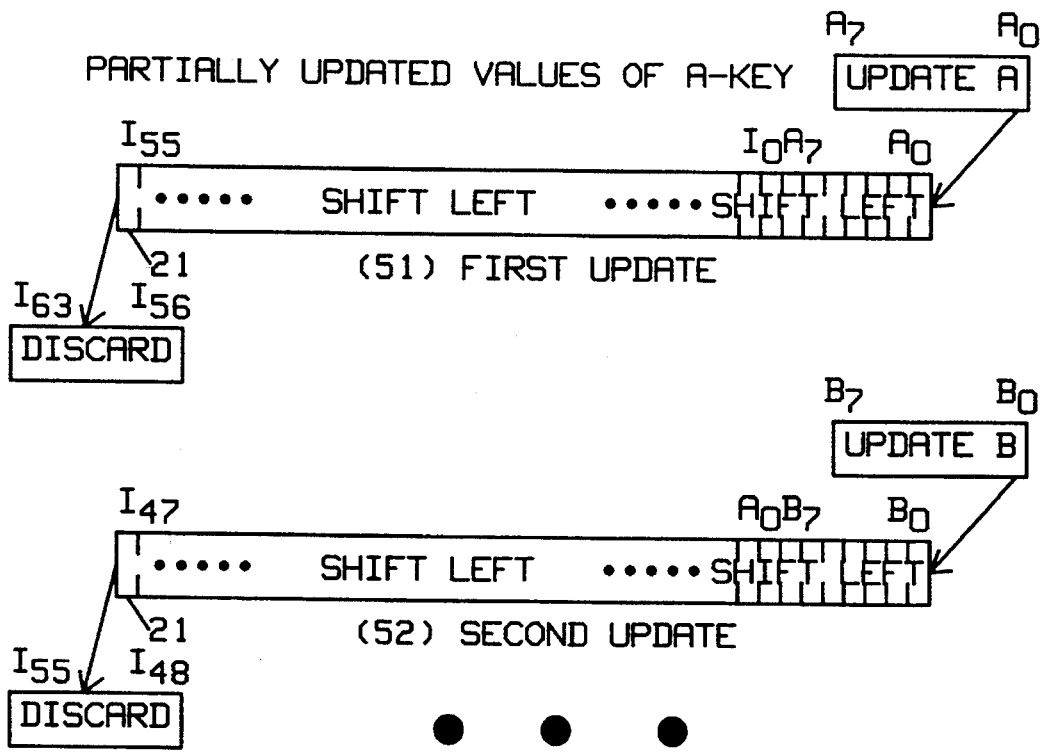
Figure 4:
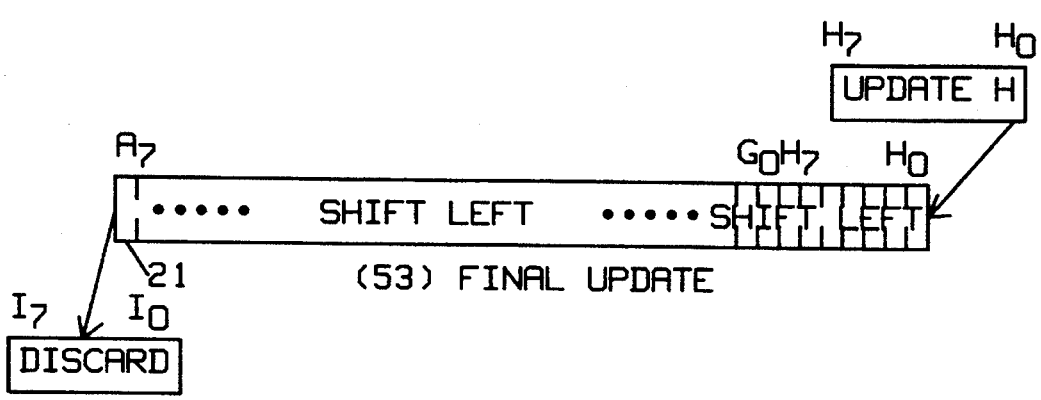
Figure 4:
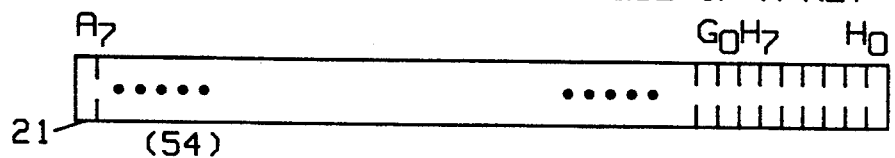

Once the new A-key value information is received by the subscriber station (20), it will be shifted into the A-key register (21) at step 316 of the subscriber station (20) beginning with the most significant bit first, as illustrated in FIG. 4. Any initial, or default, A-Key value information (50) stored in the A-key register (21) will be shifted out of the A-Key register (21) and replaced with the new A-Key information transmitted from the Base Station (20). During an intermediate stage of the A-Key value update (51–53), when only a portion of the new A-Key value has been transmitted to the subscriber station, the A-Key value register will contain an intermediate A-Key value which is comprised of all new A-Key value information received, concatenated with the remaining portion of the old, default or initial, A-Key value.

Each time the subscriber station receives an A-Key value update from the Base Station, an internal counter (22), the "received update counter" is incremented at step 318 to coincide with the number of updates received from the base station (10). Similarly, the base station (10) maintains an independent update counter (14), the "transmitted update counter" which is incremented each time an A-Key value update is transmitted to the subscriber station at step 314.

Once the value stored in the internal update counter of the subscriber station (20) is incremented it can then be reported via a wireless interface back to the base station (10) at step 324. If the received update counter value received by the base station (10) from the subscriber station (20) is different from the base station transmitted update counter value at step 330, the base station will synchronize its transmitted update counter to coincide with the received update counter value reported by the subscriber station (20) at step 334. The base station (20) will then begin transmitting, the new A-Key value information to the subscriber station (10) all over again, from step 308, at randomly occurring times during active conversation states of the subscriber station. Eventually all invalid or old portions of the A-Key value stored in the subscriber station's memory will be replaced with a new valid A-Key value at step 338 which can be used to authenticate the subscriber station (20) in accordance with TIA Interim Standard IS-54. In a cellular communications system, the update counter information from the subscriber station (20) may be transmitted to the base station (10) as an acknowledgement message on either the Analog or Digital Traffic Channels.

All throughout the A-Key value update process, any previously existing calculated SSD, or Shared Secret Data, values remain active and valid. The new or intermediate A-Key value does not take effect or become active, until such time as the Base Station initiates an SSD Update procedure in accordance with TIA Interim Standard IS-54, in which case the new or intermediate A-Key value will be utilized in generating a new SSD update.

The transmitting and update of operational information such as the secret A-Key value information can be accomplished using, for instance, the Forward Analog Voice Channel (FVC) or a Fast Associated Control Channel (FACCH) such as those commonly used in cellular telephone systems as the medium for the wireless interface. A Forward Analog Voice Channel is commonly used for communications from the Base Station to the mobile or subscriber Station. The Fast Associated Control Channel may also be used for signaling message exchanges between a Base Station and a Subscriber Station.

Figure 5:
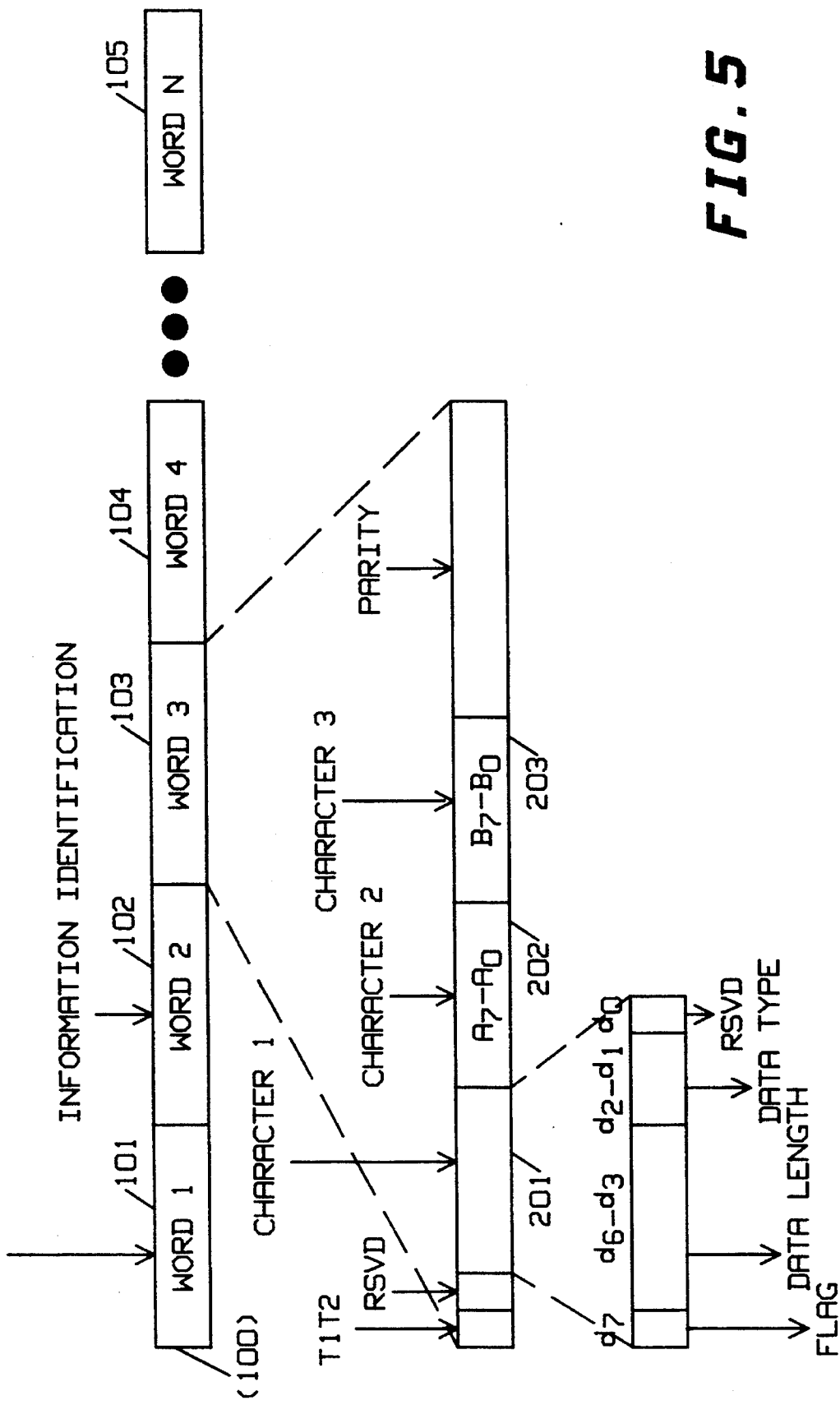
FIG. 5 is a diagram illustrating the transfer of operational information during a Flash With Information Message on a Forward Analog Voice Channel.

FIG. 5 illustrates one embodiment of the present invention implemented in a cellular telephone system in which a Flash With Information message is sent from the Base Station to a Subscriber Station, via a Forward Analog Voice Channel of the cellular system, to invoke the A-Key update process of the present invention. It can be seen that a string of data (100) is transmitted to the subscriber station via the Forward Analog Voice Channel as a data string comprised of Word 1 through Word N (101, 102, 103, 104 and 105). It will be recognized that a Word may comprise multiple Characters, or Character Fields, for example up to three 8-bit Characters per Word. Likewise, each Character or Character Field may be comprised of a multiple number of bits of information, for example 8 bits per character. According to TIA Interim Standard IS-54, the Most Significant Bit of the Character fields of a Flash With Information Message is usually set to "0", while the remaining seven bits of the Character elements generally represent an ASCII value of the information being transmitted therein. It is possible, however, to select an alternate format for the transmitted data by setting the Most Significant Bit of the first Character of a Word, such as Word 3 (103), to "1" so that information can be conveyed in a different sequence or format. For instance, where Character field 2 (202) and Character field 3 (203) of Word 3 (103) can carry up to 16 consecutive valid bits of a new A-key value, the seven remaining least significant bits of Character field 1 (201) could be assigned as follows to accomplish the A-Key value update procedure of the present invention:

d6-d3—four bits representing the length or number of bits of valid A-Key data to follow in Word 3 (103). A value of "0000" could, for example, indicate that only bit A7 of Character 2 (202) is a valid A-Key update data. A value of "1111" could indicate, for example, that all 16 bits of Character 2 (202) and Character 3 (203) are valid A-Key update data.

d2-d1—these two bits could be assigned to represent the type of update data transmitted in message Word 3 (103). For instance, a value of "00" could be assigned to represent A-Key Update data. Of course, other values could be used to indicate an update value of some other type.

d0—this bit could be reserved for future expansion.

With this format, four message Words could carry, or convey, the complete 64 bits commonly required for a full new A-key value. As previously noted, these Words can be transmitted in a consecutive order as parts of a single Flash With Information Message, or separately in more than one unrelated Flash With Information message transmissions. The message Words used to convey A-Key up-date information can also be combined with in the same message with other Words having a different format from the proposed format for A-Key update information.

In the illustration shown in FIG. 5, Word 1 (101) indicates to the Subscriber Station that it should treat the information to follow, Word 2 through Word N (102–105), as a Flash With Information Message in accordance with TIA Interim Standard IS-54. Word 2 (102) then identifies the format of the information to the Subscriber Station by setting out such information as, for example, the total number of bits of information to follow or the total number of Characters to follow which represent new A-Key value information.

Word 3 (103) is the first Word in the data string to contain new A-Key information. Word 3 is comprised of three characters 1–3 (201–203) along with parity data and information, T1T2, indicating whether Word 3 is a part, or continuation of a multi-word message. Character 1 (201) conveys the type and length of the data to follow in Word 3 (103), for example—A-Key information of two characters in length. The Subscriber Station (20) can then know to load, or shift, the following new A-Key information into the A-Key register of the subscriber station. Character 2(202) and Character 3 (203) contain the actual new, or updated, A-Key information. This information is, for example, 8 bits per Character or 16 bits in total, and is shifted into the A-Key register to update the contents thereof. Word 4 (104) through Word N (105) are continuations of the A-Key update information like Word 3.

It will be recognized by those skilled in the art that the present invention can also be similarly implemented by using a Fast Associated Control Channel, or other wireless channel, to convey the A-Key or other operational information to the subscriber station. The present invention is not limited to use in Analog wireless communications systems, but is equally applicable to digital wireless communications systems, such as digital cellular telephone networks. It will be recognized that other message exchanges means can also be devised to request and deliver information from, to and between the subscriber station and a base station. Further, it will also be recognized that other message formats could be selected to achieve similar results. Data formats shown above are intended only as an example of the many possible variations thereon, and are not intended as a limitation.

While the discussions of the preferred embodiment have related to the downloading of authentication information to a subscriber station via a wireless interface comprised of a Forward Analog Voice Channel, it will be recognized by persons skilled in the art that the present invention can be used to download many other types of information. For example, a newly assigned Mobile Identification Number (MIN) could be downloaded to a new subscriber in exchange for the upload of the user's credit card information, or other billing information.

What is claimed is:

1. A method for downloading operational information into a wireless subscriber station comprising the steps of:

generating operational information;

storing said generated operational information into a first memory of a wireless base station;

transmitting a portion of said operational information stored in said first memory, to a wireless subscriber station via a wireless interface at random times during an active conversation state of said wireless subscriber station so as to update operational information stored in a second memory in said subscriber station;

updating a first update counter in said base station to reflect the number of times a portion of operational information has been transferred by said base station;

transferring said operational information received from said wireless base station into said second memory;

updating the value of a second update counter in said subscriber station when a portion of said operational information is received by said communications subscriber station;

reporting the updated value of said second update counter to said wireless base station via wireless interface;

synchronizing said first update counter with said reported value of said second update counter where the value of said first update counter is different from said reported value of said second update counter; and, where said first update counter has been synchronized with said reported value of said second update counter, transmitting a portion of said operational information to said subscriber station.

2. A method for downloading operational information into a wireless subscriber station according to claim 1 wherein said wireless subscriber station is a cellular telephone.

3. A method for downloading operational information into a wireless subscriber station according to claim 2 wherein said operational information is A-Key value information.

4. A method of updating operational information stored in a storage memory of a subscriber station comprising the steps of:

generating operational information;

storing said operational information in a storage memory in a base station;

transmitting a portion of said operational information stored in said storage memory to a subscriber station via a wireless interface during an active conversation state of said subscriber station;

incrementing a first counter in said base station to reflect the number of times a portion of said operational information has been transmitted;

receiving information reflecting the contents of a second counter in said subscriber station which represents the number of times a portion of said operational information has been received by said subscriber station;

comparing the contents of said first counter with said information reflecting the contents of said second counter;

where said contents of said first counter do not match said information reflecting said contents of said second counter, synchronizing the contents of said first counter to match said information reflecting said contents of said second counter and retransmitting said portion of said operational information; and, where said contents of said first counter do match said information reflecting said contents of said second counter, transmitting a remaining portion of said operational information to said subscriber station via wireless interface during an active conversation state of said subscriber station.

5. A wireless base station comprising:

generating means for generating operational information for assignment to a wireless subscriber station;

storage memory for storing said generated operational information;

transmitter for transmitting a portion of said operational information stored in said storage memory to a subscriber station during an active conversation state via a Fast Associated Control Channel of a Cellular communications system;

update counter for maintaining count of the number of times a portion of said operational information is transmitted to said subscriber station; and, receiver for receiving update information from said subscriber station which represents that number of times said subscriber station has received a portion of said operational information transmitted via said transmitter.

6. A wireless base station comprising:

generating means for generating operational information for assignment to a wireless subscriber station;

storage memory for storing said generated operational information;

transmitter for transmitting a portion of said operational information stored in said storage memory to a subscriber station during an active conversation state via a Forward Analog Control Channel of a Cellular communications system;

update counter for maintaining count of the number of times a portion of said operational information is transmitted to said subscriber station; and, receiver for receiving update information from said subscriber station which represents that number of times said subscriber station has received a portion of said operational information transmitted via said transmitter.

* * * * *